US008521530B1

(12) United States Patent
Every et al.

(10) Patent No.: US 8,521,530 B1
(45) Date of Patent: Aug. 27, 2013

(54) SYSTEM AND METHOD FOR ENHANCING A MONAURAL AUDIO SIGNAL

(75) Inventors: Mark Every, Palo Alto, CA (US); David Klein, Los Altos, CA (US)

(73) Assignee: Audience, Inc., Mountain View, CA (US)

( * ) Notice: Subject to any disclaimer, the term of this patent is extended or adjusted under 35 U.S.C. 154(b) by 842 days.

(21) Appl. No.: 12/217,076

(22) Filed: Jun. 30, 2008

(51) Int. Cl.
*G10L 15/04* (2006.01)
*G10L 15/20* (2006.01)
*G10L 19/12* (2006.01)
*G10L 19/14* (2006.01)
*G10L 17/00* (2006.01)
*G10L 11/06* (2006.01)
*H04B 3/20* (2006.01)
*H03B 29/00* (2006.01)

(52) U.S. Cl.
USPC ........... 704/251; 704/233; 704/222; 704/225; 704/248; 704/208; 381/66; 381/71.6

(58) Field of Classification Search
USPC .............. 704/233, 222, 225, 251, 200.1, 248, 704/254, 226, 208; 381/66, 71.6
See application file for complete search history.

(56) References Cited

U.S. PATENT DOCUMENTS

| | | | |
|---|---|---|---|
| 3,976,863 A | 8/1976 | Engel | |
| 3,978,287 A | 8/1976 | Fletcher et al. | |
| 4,137,510 A | 1/1979 | Iwahara | |
| 4,433,604 A | 2/1984 | Ott | |
| 4,516,259 A | 5/1985 | Yato et al. | |
| 4,535,473 A * | 8/1985 | Sakata | 704/248 |
| 4,536,844 A | 8/1985 | Lyon | |
| 4,581,758 A | 4/1986 | Coker et al. | |
| 4,628,529 A | 12/1986 | Borth et al. | |
| 4,630,304 A | 12/1986 | Borth et al. | |
| 4,649,505 A | 3/1987 | Zinser, Jr. et al. | |
| 4,658,426 A | 4/1987 | Chabries et al. | |
| 4,674,125 A | 6/1987 | Carlson et al. | |
| 4,718,104 A | 1/1988 | Anderson | |
| 4,811,404 A | 3/1989 | Vilmur et al. | |
| 4,812,996 A | 3/1989 | Stubbs | |
| 4,864,620 A | 9/1989 | Bialick | |

(Continued)

FOREIGN PATENT DOCUMENTS

| | | |
|---|---|---|
| JP | 62110349 | 5/1987 |
| JP | 4184400 | 7/1992 |

(Continued)

OTHER PUBLICATIONS

Ron Weiss and Daniel P. W. Ellis, Estimating single-channel source separation masks: relevance vector machine classifiers vs. pitch-based masking. Workshop on Statistical and Perceptual Audio Processing, 2006.*

(Continued)

*Primary Examiner* — Pierre-Louis Desir
*Assistant Examiner* — Neeraj Sharma
(74) *Attorney, Agent, or Firm* — Carr & Ferrell LLP

(57) ABSTRACT

A method, system, and computer program for enhancing a signal are presented. The signal is received, and energy estimates of the signal may be determined. At least one characteristic of the signal may be inferred based on the energy estimates. A mask may be generated based, in part, on the at least one characteristic. In turn, the mask may be applied to the signal to produce an enhanced signal, which may be outputted.

18 Claims, 7 Drawing Sheets

(56) References Cited

U.S. PATENT DOCUMENTS

| | | | |
|---|---|---|---|
| 4,920,508 A | 4/1990 | Yassaie et al. | |
| 5,027,410 A | 6/1991 | Williamson et al. | |
| 5,054,085 A | 10/1991 | Meisel et al. | |
| 5,058,419 A | 10/1991 | Nordstrom et al. | |
| 5,099,738 A | 3/1992 | Hotz | |
| 5,119,711 A | 6/1992 | Bell et al. | |
| 5,142,961 A | 9/1992 | Paroutaud | |
| 5,150,413 A | 9/1992 | Nakatani et al. | |
| 5,175,769 A | 12/1992 | Hejna, Jr. et al. | |
| 5,187,776 A | 2/1993 | Yanker | |
| 5,208,864 A | 5/1993 | Kaneda | |
| 5,210,366 A | 5/1993 | Sykes, Jr. | |
| 5,224,170 A | 6/1993 | Waite, Jr. | |
| 5,230,022 A | 7/1993 | Sakata | |
| 5,289,273 A | 2/1994 | Lang | |
| 5,319,736 A | 6/1994 | Hunt | |
| 5,323,459 A | 6/1994 | Hirano | |
| 5,341,432 A | 8/1994 | Suzuki et al. | |
| 5,381,473 A | 1/1995 | Andrea et al. | |
| 5,381,512 A | 1/1995 | Holton et al. | |
| 5,400,409 A | 3/1995 | Linhard | |
| 5,402,493 A | 3/1995 | Goldstein | |
| 5,402,496 A | 3/1995 | Soli et al. | |
| 5,471,195 A | 11/1995 | Rickman | |
| 5,473,702 A | 12/1995 | Yoshida et al. | |
| 5,473,759 A | 12/1995 | Slaney et al. | |
| 5,479,564 A | 12/1995 | Vogten et al. | |
| 5,502,663 A | 3/1996 | Lyon | |
| 5,544,250 A | 8/1996 | Urbanski | |
| 5,574,824 A | 11/1996 | Slyh et al. | |
| 5,583,784 A | 12/1996 | Kapust et al. | |
| 5,587,998 A | 12/1996 | Velardo, Jr. et al. | |
| 5,590,241 A | 12/1996 | Park et al. | |
| 5,602,962 A | 2/1997 | Kellermann | |
| 5,675,778 A | 10/1997 | Jones | |
| 5,682,463 A | 10/1997 | Allen et al. | |
| 5,694,474 A | 12/1997 | Ngo et al. | |
| 5,706,395 A | 1/1998 | Arslan et al. | |
| 5,717,829 A | 2/1998 | Takagi | |
| 5,729,612 A | 3/1998 | Abel et al. | |
| 5,732,189 A | 3/1998 | Johnston et al. | |
| 5,749,064 A | 5/1998 | Pawate et al. | |
| 5,757,937 A | 5/1998 | Itoh et al. | |
| 5,792,971 A | 8/1998 | Timis et al. | |
| 5,796,819 A | 8/1998 | Romesburg | |
| 5,806,025 A | 9/1998 | Vis et al. | |
| 5,809,463 A | 9/1998 | Gupta et al. | |
| 5,825,320 A | 10/1998 | Miyamori et al. | |
| 5,839,101 A | 11/1998 | Vahatalo et al. | |
| 5,845,243 A * | 12/1998 | Smart et al. | 704/200.1 |
| 5,920,840 A | 7/1999 | Satyamurti et al. | |
| 5,933,495 A | 8/1999 | Oh | |
| 5,943,429 A | 8/1999 | Handel | |
| 5,956,674 A | 9/1999 | Smyth et al. | |
| 5,974,380 A | 10/1999 | Smyth et al. | |
| 5,978,824 A | 11/1999 | Ikeda | |
| 5,983,139 A | 11/1999 | Zierhofer | |
| 5,990,405 A | 11/1999 | Auten et al. | |
| 6,002,776 A | 12/1999 | Bhadkamkar et al. | |
| 6,061,456 A | 5/2000 | Andrea et al. | |
| 6,072,881 A | 6/2000 | Linder | |
| 6,097,820 A | 8/2000 | Turner | |
| 6,108,626 A | 8/2000 | Cellario et al. | |
| 6,122,610 A | 9/2000 | Isabelle | |
| 6,134,524 A * | 10/2000 | Peters et al. | 704/233 |
| 6,137,349 A | 10/2000 | Menkhoff et al. | |
| 6,140,809 A | 10/2000 | Doi | |
| 6,173,255 B1 | 1/2001 | Wilson et al. | |
| 6,180,273 B1 | 1/2001 | Okamoto | |
| 6,205,422 B1 * | 3/2001 | Gu et al. | 704/233 |
| 6,216,103 B1 | 4/2001 | Wu et al. | |
| 6,219,408 B1 | 4/2001 | Kurth | |
| 6,222,927 B1 | 4/2001 | Feng et al. | |
| 6,223,090 B1 | 4/2001 | Brungart | |
| 6,226,616 B1 | 5/2001 | You et al. | |
| 6,263,307 B1 | 7/2001 | Arslan et al. | |
| 6,266,633 B1 | 7/2001 | Higgins et al. | |
| 6,317,501 B1 | 11/2001 | Matsuo | |
| 6,321,193 B1 * | 11/2001 | Nystrom et al. | 704/222 |
| 6,339,758 B1 | 1/2002 | Kanazawa et al. | |
| 6,343,267 B1 | 1/2002 | Kuhn et al. | |
| 6,355,869 B1 | 3/2002 | Mitton | |
| 6,363,345 B1 | 3/2002 | Marash et al. | |
| 6,381,570 B2 | 4/2002 | Li et al. | |
| 6,430,295 B1 | 8/2002 | Handel et al. | |
| 6,434,417 B1 | 8/2002 | Lovett | |
| 6,449,586 B1 | 9/2002 | Hoshuyama | |
| 6,453,289 B1 * | 9/2002 | Ertem et al. | 704/225 |
| 6,469,732 B1 | 10/2002 | Chang et al. | |
| 6,487,257 B1 | 11/2002 | Gustafsson et al. | |
| 6,496,795 B1 | 12/2002 | Malvar | |
| 6,513,004 B1 | 1/2003 | Rigazio et al. | |
| 6,516,066 B2 | 2/2003 | Hayashi | |
| 6,529,606 B1 | 3/2003 | Jackson, Jr. II, et al. | |
| 6,549,630 B1 | 4/2003 | Bobisuthi | |
| 6,584,203 B2 | 6/2003 | Elko et al. | |
| 6,622,030 B1 | 9/2003 | Romesburg et al. | |
| 6,717,991 B1 | 4/2004 | Gustafsson et al. | |
| 6,718,309 B1 | 4/2004 | Selly | |
| 6,738,482 B1 | 5/2004 | Jaber | |
| 6,748,095 B1 | 6/2004 | Goss | |
| 6,760,450 B2 | 7/2004 | Matsuo | |
| 6,785,381 B2 | 8/2004 | Gartner et al. | |
| 6,792,118 B2 | 9/2004 | Watts | |
| 6,795,558 B2 | 9/2004 | Matsuo | |
| 6,798,886 B1 | 9/2004 | Smith et al. | |
| 6,810,273 B1 | 10/2004 | Mattila et al. | |
| 6,882,736 B2 | 4/2005 | Dickel et al. | |
| 6,915,264 B2 | 7/2005 | Baumgarte | |
| 6,917,688 B2 | 7/2005 | Yu et al. | |
| 6,944,510 B1 | 9/2005 | Ballesty et al. | |
| 6,978,159 B2 | 12/2005 | Feng et al. | |
| 6,982,377 B2 | 1/2006 | Sakurai et al. | |
| 6,999,582 B1 | 2/2006 | Popovic et al. | |
| 7,016,507 B1 * | 3/2006 | Brennan | 381/71.6 |
| 7,020,605 B2 | 3/2006 | Gao | |
| 7,031,478 B2 | 4/2006 | Belt et al. | |
| 7,054,452 B2 | 5/2006 | Ukita | |
| 7,065,485 B1 | 6/2006 | Chong-White et al. | |
| 7,072,834 B2 | 7/2006 | Zhou | |
| 7,076,315 B1 | 7/2006 | Watts | |
| 7,092,529 B2 | 8/2006 | Yu et al. | |
| 7,092,882 B2 | 8/2006 | Arrowood et al. | |
| 7,099,821 B2 | 8/2006 | Visser et al. | |
| 7,142,677 B2 | 11/2006 | Gonopolskiy et al. | |
| 7,146,316 B2 | 12/2006 | Alves | |
| 7,155,019 B2 | 12/2006 | Hou | |
| 7,164,620 B2 | 1/2007 | Hoshuyama | |
| 7,171,008 B2 | 1/2007 | Elko | |
| 7,171,246 B2 | 1/2007 | Mattila et al. | |
| 7,174,022 B1 | 2/2007 | Zhang et al. | |
| 7,206,418 B2 | 4/2007 | Yang et al. | |
| 7,209,567 B1 | 4/2007 | Kozel et al. | |
| 7,225,001 B1 | 5/2007 | Eriksson et al. | |
| 7,242,762 B2 | 7/2007 | He et al. | |
| 7,246,058 B2 | 7/2007 | Burnett | |
| 7,254,242 B2 | 8/2007 | Ise et al. | |
| 7,359,520 B2 | 4/2008 | Brennan et al. | |
| 7,383,179 B2 | 6/2008 | Alves et al. | |
| 7,412,379 B2 | 8/2008 | Taori et al. | |
| 7,433,907 B2 | 10/2008 | Nagai et al. | |
| 7,555,075 B2 | 6/2009 | Pessoa et al. | |
| 7,555,434 B2 | 6/2009 | Nomura et al. | |
| 7,617,099 B2 | 11/2009 | Yang et al. | |
| 7,664,640 B2 | 2/2010 | Webber | |
| 7,783,481 B2 * | 8/2010 | Endo et al. | 704/226 |
| 7,949,522 B2 * | 5/2011 | Hetherington et al. | 704/226 |
| 7,953,596 B2 * | 5/2011 | Pinto | 704/233 |
| 8,010,355 B2 * | 8/2011 | Rahbar | 704/233 |
| 8,098,812 B2 | 1/2012 | Fadili et al. | |
| 8,280,731 B2 * | 10/2012 | Yu | 704/226 |
| 8,363,850 B2 | 1/2013 | Amada | |
| 2001/0016020 A1 | 8/2001 | Gustafsson et al. | |
| 2001/0031053 A1 | 10/2001 | Feng et al. | |

| | | | | | | |
|---|---|---|---|---|---|---|
| 2001/0038699 | A1 | 11/2001 | Hou | 2008/0201138 | A1 | 8/2008 | Visser et al. |
| 2002/0002455 | A1 | 1/2002 | Accardi et al. | 2008/0228478 | A1 | 9/2008 | Hetherington et al. |
| 2002/0009203 | A1 | 1/2002 | Erten | 2008/0260175 | A1 | 10/2008 | Elko |
| 2002/0041693 | A1 | 4/2002 | Matsuo | 2009/0012783 | A1 | 1/2009 | Klein |
| 2002/0080980 | A1 | 6/2002 | Matsuo | 2009/0012786 | A1 | 1/2009 | Zhang et al. |
| 2002/0106092 | A1 | 8/2002 | Matsuo | 2009/0080632 | A1 | 3/2009 | Zhang et al. |
| 2002/0116187 | A1 | 8/2002 | Erten | 2009/0129610 | A1 | 5/2009 | Kim et al. |
| 2002/0133334 | A1 | 9/2002 | Coorman et al. | 2009/0220107 | A1 | 9/2009 | Every et al. |
| 2002/0147595 | A1 | 10/2002 | Baumgarte | 2009/0228272 | A1 | 9/2009 | Herbig et al. |
| 2002/0184013 | A1 | 12/2002 | Walker | 2009/0238373 | A1 | 9/2009 | Klein |
| 2003/0014248 | A1 | 1/2003 | Vetter | 2009/0253418 | A1 | 10/2009 | Makinen |
| 2003/0026437 | A1 | 2/2003 | Janse et al. | 2009/0271187 | A1 | 10/2009 | Yen et al. |
| 2003/0033140 | A1 | 2/2003 | Taori et al. | 2009/0296958 | A1 | 12/2009 | Sugiyama |
| 2003/0039369 | A1 | 2/2003 | Bullen | 2009/0323982 | A1 | 12/2009 | Solbach et al. |
| 2003/0040908 | A1 | 2/2003 | Yang et al. | 2010/0094643 | A1 | 4/2010 | Avendano et al. |
| 2003/0061032 | A1 | 3/2003 | Gonopolskiy | 2010/0166199 | A1* | 7/2010 | Seydoux ............ 381/66 |
| 2003/0063759 | A1 | 4/2003 | Brennan et al. | 2010/0278352 | A1 | 11/2010 | Petit et al. |
| 2003/0072382 | A1 | 4/2003 | Raleigh et al. | 2010/0282045 | A1 | 11/2010 | Chen et al. |
| 2003/0072460 | A1 | 4/2003 | Gonopolskiy et al. | 2011/0035213 | A1* | 2/2011 | Malenovsky et al. ......... 704/208 |
| 2003/0095667 | A1 | 5/2003 | Watts | 2011/0178800 | A1 | 7/2011 | Watts |
| 2003/0099345 | A1 | 5/2003 | Gartner et al. | 2011/0182436 | A1 | 7/2011 | Murgia et al. |
| 2003/0101048 | A1 | 5/2003 | Liu | 2012/0093341 | A1 | 4/2012 | Kim et al. |
| 2003/0103632 | A1 | 6/2003 | Goubran et al. | 2012/0121096 | A1 | 5/2012 | Chen et al. |
| 2003/0128851 | A1 | 7/2003 | Furuta | 2012/0140917 | A1 | 6/2012 | Nicholson et al. |
| 2003/0138116 | A1 | 7/2003 | Jones et al. | | | | |
| 2003/0147538 | A1 | 8/2003 | Elko | | | | |

FOREIGN PATENT DOCUMENTS

| | | |
|---|---|---|
| JP | 5053587 | 3/1993 |
| JP | 05-172865 | 7/1993 |
| JP | 6269083 | 9/1994 |
| JP | 10-313497 | 11/1998 |
| JP | 11-249693 | 9/1999 |
| JP | 2004053895 | 2/2004 |
| JP | 2004531767 | 10/2004 |
| JP | 2004533155 | 10/2004 |
| JP | 2005110127 | 4/2005 |
| JP | 2005148274 | 6/2005 |
| JP | 2005518118 | 6/2005 |
| JP | 2005195955 | 7/2005 |
| WO | 01/74118 | 10/2001 |
| WO | 02080362 | 10/2002 |
| WO | 02103676 | 12/2002 |
| WO | 03/043374 | 5/2003 |
| WO | 03/069499 | 8/2003 |
| WO | 03069499 | 8/2003 |
| WO | 2004/010415 | 1/2004 |
| WO | 2007/081916 | 7/2007 |
| WO | 2007/140003 | 12/2007 |
| WO | 2010/005493 | 1/2010 |
| WO | 2011/094232 | 8/2011 |

| | | | |
|---|---|---|---|
| 2003/0169891 | A1 | 9/2003 | Ryan et al. |
| 2003/0228023 | A1 | 12/2003 | Burnett et al. |
| 2004/0013276 | A1 | 1/2004 | Ellis et al. |
| 2004/0047464 | A1 | 3/2004 | Yu et al. |
| 2004/0057574 | A1 | 3/2004 | Faller |
| 2004/0078199 | A1 | 4/2004 | Kremer et al. |
| 2004/0131178 | A1 | 7/2004 | Shahaf et al. |
| 2004/0133421 | A1 | 7/2004 | Burnett et al. |
| 2004/0165736 | A1 | 8/2004 | Hetherington et al. |
| 2004/0196989 | A1 | 10/2004 | Friedman et al. |
| 2004/0263636 | A1 | 12/2004 | Cutler et al. |
| 2005/0025263 | A1 | 2/2005 | Wu |
| 2005/0027520 | A1 | 2/2005 | Mattila et al. |
| 2005/0049864 | A1 | 3/2005 | Kaltenmeier et al. |
| 2005/0060142 | A1 | 3/2005 | Visser et al. |
| 2005/0152559 | A1 | 7/2005 | Gierl et al. |
| 2005/0185813 | A1 | 8/2005 | Sinclair et al. |
| 2005/0203735 | A1* | 9/2005 | Ichikawa .............. 704/226 |
| 2005/0213778 | A1 | 9/2005 | Buck et al. |
| 2005/0216259 | A1 | 9/2005 | Watts |
| 2005/0228518 | A1 | 10/2005 | Watts |
| 2005/0238238 | A1 | 10/2005 | Xu et al. |
| 2005/0276423 | A1 | 12/2005 | Aubauer et al. |
| 2005/0288923 | A1 | 12/2005 | Kok |
| 2006/0072768 | A1 | 4/2006 | Schwartz et al. |
| 2006/0074646 | A1 | 4/2006 | Alves et al. |
| 2006/0098809 | A1 | 5/2006 | Nongpiur et al. |
| 2006/0120537 | A1 | 6/2006 | Burnett et al. |
| 2006/0133621 | A1 | 6/2006 | Chen et al. |
| 2006/0149535 | A1 | 7/2006 | Choi et al. |
| 2006/0160581 | A1 | 7/2006 | Beaugeant et al. |
| 2006/0165202 | A1 | 7/2006 | Thomas et al. |
| 2006/0184363 | A1 | 8/2006 | McCree et al. |
| 2006/0198542 | A1 | 9/2006 | Benjelloun Touimi et al. |
| 2006/0222184 | A1 | 10/2006 | Buck et al. |
| 2007/0021958 | A1 | 1/2007 | Visser et al. |
| 2007/0027685 | A1 | 2/2007 | Arakawa et al. |
| 2007/0033020 | A1 | 2/2007 | (Kelleher) Francois et al. |
| 2007/0067166 | A1 | 3/2007 | Pan et al. |
| 2007/0078649 | A1 | 4/2007 | Hetherington et al. |
| 2007/0094031 | A1 | 4/2007 | Chen |
| 2007/0100612 | A1 | 5/2007 | Ekstrand et al. |
| 2007/0116300 | A1 | 5/2007 | Chen |
| 2007/0150268 | A1 | 6/2007 | Acero et al. |
| 2007/0154031 | A1 | 7/2007 | Avendano et al. |
| 2007/0165879 | A1 | 7/2007 | Deng et al. |
| 2007/0195968 | A1 | 8/2007 | Jaber |
| 2007/0230712 | A1 | 10/2007 | Belt et al. |
| 2007/0276656 | A1 | 11/2007 | Solbach et al. |
| 2008/0019548 | A1 | 1/2008 | Avendano |
| 2008/0033723 | A1* | 2/2008 | Jang et al. .............. 704/254 |
| 2008/0071540 | A1* | 3/2008 | Nakano et al. ......... 704/251 |
| 2008/0140391 | A1 | 6/2008 | Yen et al. |

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. "Acoustic Noise Suppression Using Regression Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

Hermansky, Hynek "Should Recognizers Have Ears?", In Proc. ESCA Tutorial and Research Workshop on Robust Speech Recognition for Unknown Communication Channels, pp. 1-10, France 1997.

Hohmann, V. "Frequency Analysis and Synthesis Using a Gammatone Filterbank", ACTA Acustica United with Acustica, 2002, vol. 88, pp. 433-442.

Jeffress, Lloyd A. et al. "A Place Theory of Sound Localization," Journal of Comparative and Physiological Psychology, 1948, vol. 41, p. 35-39.

Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.

Kates, James M. "A Time-Domain Digital Cochlear Model", IEEE Transactions on Signal Processing, Dec. 1991, vol. 39, No. 12, pp. 2573-2592.

Lazzaro, John et al., "A Silicon Model of Auditory Localization," Neural Computation Spring 1989, vol. 1, pp. 47-57, Massachusetts Institute of Technology.

Lippmann, Richard P. "Speech Recognition by Machines and Humans", Speech Communication, Jul. 1997, vol. 22, No. 1, pp. 1-15.

Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.

Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.

Martin, Rainer "Spectral Subtraction Based on Minimum Statistics", in Proceedings Europe. Signal Processing Conf., 1994, pp. 1182-1185.

Mitra, Sanjit K. Digital Signal Processing: a Computer-based Approach. 2nd Ed. 2001. pp. 131-133.

Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.

Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.

Watts, Lloyd Narrative of Prior Disclosure of Audio Display on Feb. 15, 2000 and May 31, 2000.

Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.

Parra, Lucas et al. "Convolutive Blind Separation of Non-Stationary Sources", IEEE Transactions on Speech and Audio Processing. vol. 8, No. 3, May 2008, pp. 320-327.

Rabiner, Lawrence R. et al. "Digital Processing of Speech Signals", (Prentice-Hall Series in Signal Processing). Upper Saddle River, NJ: Prentice Hall, 1978.

Schimmel, Steven et al., "Coherent Envelope Detection for Modulation Filtering of Speech," 2005 IEEE International Conference on Acoustics, Speech, and Signal Processing, vol. 1, No. 7, pp. 221-224.

Slaney, Malcom, "Lyon's Cochlear Model", Advanced Technology Group, Apple Technical Report #13, Apple Computer, Inc., 1988, pp. 1-79.

Slaney, Malcom, et al. "Auditory Model Inversion for Sound Separation," 1994 IEEE International Conference on Acoustics, Speech and Signal Processing, Apr. 19-22, vol. 2, pp. 77-80.

Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.

Solbach, Ludger "An Architecture for Robust Partial Tracking and Onset Localization in Single Channel Audio Signal Mixes", Technical University Hamburg-Harburg, 1998.

Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.

Syntrillium Software Corporation, "Cool Edit User's Manual", 1996, pp. 1-74.

Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).

Tchorz, Jurgen et al., "SNR Estimation Based on Amplitude Modulation Analysis with Applications to Noise Suppression", IEEE Transactions on Speech and Audio Processing, Vol. 11, No. 3, May 2003, pp. 184-192.

Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.

Watts, Lloyd, "Robust Hearing Systems for Intelligent Machines," Applied Neurosystems Corporation, 2001, pp. 1-5.

Widrow, B. et al., "Adaptive Antenna Systems," Proceedings of the IEEE, vol. 55, No. 12, pp. 2143-2159, Dec. 1967.

Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.

International Search Report dated Jun. 8, 2001 in Application No. PCT/US01/08372.

International Search Report dated Apr. 3, 2003 in Application No. PCT/US02/36946.

International Search Report dated May 29, 2003 in Application No. PCT/US03/04124.

International Search Report and Written Opinion dated Oct. 19, 2007 in Application No. PCT/US07/00463.

International Search Report and Written Opinion dated Apr. 9, 2008 in Application No. PCT/US07/21654.

International Search Report and Written Opinion dated Sep. 16, 2008 in Application No. PCT/US07/12628.

International Search Report and Written Opinion dated Oct. 1, 2008 in Application No. PCT/US08/08249.

International Search Report and Written Opinion dated May 11, 2009 in Application No. PCT/US09/01667.

International Search Report and Written Opinion dated Aug. 27, 2009 in Application No. PCT/US09/03813.
International Search Report and Written Opinion dated May 20, 2010 in Application No. PCT/US09/06754.
Fast Cochlea Transform, US Trademark Reg. No. 2,875,755 (Aug. 17, 2004).
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.
International Search Report and Written Opinion dated Mar. 31, 2011 in Application No. PCT/US11/22462.
Fazel et al., An overview of statistical pattern recognition techniques for speaker verification, IEEE, May 2011.
Sundaram et al, Discriminating two types of noise sources using cortical representation and dimension reduction technique, IEE, 2007.
Bach et al, Learning Spectral Clustering with application to speech separation, Journal of machine learning research, 2006.
Tognieri et al, a comparison of the LBG,LVQ, MLP,SOM and GMM algorithms for Vector Quantisation and Clustering Analysis, 1992.
Klautau et al, Discriminative Gaussian Mixture Models a Comparison with Kernel Classifiers, ICML, 2003.

* cited by examiner

SYSTEM AND METHOD FOR ENHANCING A MONAURAL AUDIO SIGNAL

CROSS-REFERENCE TO RELATED APPLICATIONS

The present application is related to U.S. patent application Ser. No. 11/343,524, filed Jan. 30, 2006 and entitled "System and Method for Utilizing Inter-Microphone Level Differences for Speech Enhancement," U.S. patent application Ser. No. 11/825,563, filed Jul. 6, 2007 and entitled "System and Method for Adaptive Intelligent Noise Suppression," and U.S. patent application Ser. No. 12/072,931, filed Feb. 29, 2008 and entitled "System and Method for Providing Single Microphone Noise Suppression Fallback," which all are incorporated by reference.

BACKGROUND

1. Technical Field

The present invention generally relates to audio processing. More specifically, the present invention relates to enhancing a monaural audio signal.

2. Description of Related Art

Presently, there are numerous methods for reducing background noise from speech in adverse environments. Many of these methods require multiple microphones. Techniques such as beam-forming, time-difference-of-arrival, inter-microphone level differences, and blind source separation are used to spatially filter signals from the multiple microphones to suppress noise originating from different spatial locations relative to a location of a wanted signal, such as speech.

There are also some methods for using a monaural signal to reducing background noise. For example, a noise suppressor is sometimes incorporated into speech codecs or within a telecommunications network. In these cases, the noise suppressor is commonly used to suppress only stationary or slowly time-varying background noise.

Disadvantageously, in adverse environments containing non-stationary noise, noise leakage and audio artifacts can result when using the noise suppressor. Additionally, noise originating in close proximity to a speech source may not be distinguishable from the speech source using method using the multiple microphones. Furthermore, damage to, blockage of, or mismatch between the multiple microphones may result in suboptimal performance. In these cases, a system using the multiple microphones may revert to a monaural method for noise suppression. As such, it is advantageous to have a system which may provide non-stationary noise suppression using the monaural signal, such as provided by a single microphone.

SUMMARY OF THE INVENTION

A method, system, and computer program for enhancing a signal are presented. The signal may be received by a microphone or as a downlink signal, in accordance with various embodiments. In some embodiments, the signal is converted to a frequency-domain. Energy estimates of the signal may then be determined. According to one embodiment, a speech probability distribution and a noise probability distribution are determined based on the energy estimates.

At least one characteristic of the signal may be inferred based on the energy estimates. In exemplary embodiments, the at least one characteristic may comprise a noise estimate or a signal-to-noise ratio. Various assumptions may be involved in inferring the at least one characteristic. For example, a distribution of speech energy in the signal may be assumed to be different from a distribution of noise energy in the signal. In addition, speech energy in the signal may be assumed to vary more rapidly than noise energy in the signal in various embodiments.

A mask may be generated based, in part, on the at least one characteristic. Generating the mask may include using a pitch estimate in exemplary embodiments. The mask may be applied to the signal to produce an enhanced signal. The enhanced signal may then be outputted, for example, by a speaker or as an uplink signal. According to various embodiments, the enhanced signal may be converted to a time-domain.

DETAILED DESCRIPTION

The present invention provides exemplary systems and methods for enhancing a monaural audio signal. In exemplary embodiments, enhancement (e.g., noise suppression) of the monaural audio signal may be achieved by converting the monaural audio signal from a time-domain to a frequency-domain, applying a mask to the monaural audio signal in the frequency-domain, and converting the signal back to the time-domain to obtain an enhanced signal in the time-domain. In some embodiments, the mask may be generated based, in part, on estimates of a signal-to-noise ratio (SNR) of the monaural audio signal. Additionally, estimates of speech and noise energies of the monaural audio signal may also be a basis for generating the mask in exemplary embodiments. Generation of the mask may be further based, in part, on a pitch estimate, in accordance with various embodiments. In exemplary embodiments, the pitch estimate may be determined from a preliminary noise suppressed signal obtained by applying a preliminary mask to the monaural audio signal. As a result, enhancement of the monaural audio signal may be realized such that wanted signals (e.g., speech) are clear and undistorted, while unwanted signals (e.g., noise) are optimally suppressed. While some embodiments of the present invention may be described in reference to operation on a cellular phone, the present invention may be practiced on any audio device.

Figure 1:
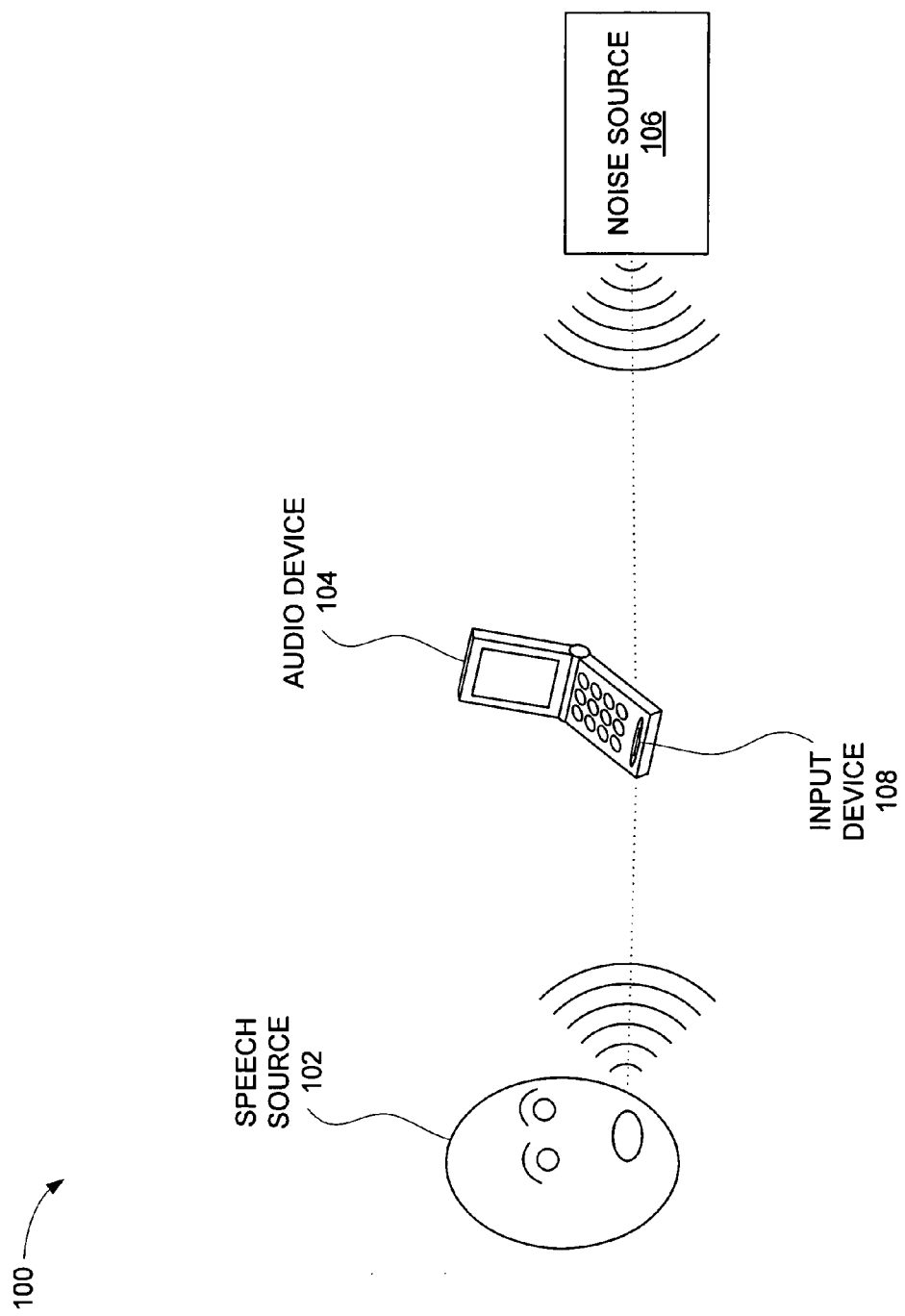
FIG. 1 illustrates an environment in which exemplary embodiments of the present invention may be practiced.

FIG. 1 illustrates an environment 100 in which exemplary embodiments of the present invention may be practiced. As depicted, the environment 100 comprises a speech source 102, an audio device 104, and a noise source 106. The audio device 104 includes an input device 108 for receiving the monaural audio signal comprising speech and noise (i.e., a mixed signal comprising both the wanted and the unwanted signals). The audio device 104 will be discussed further in connection with FIG. 2.

According to various embodiments, the speech source 102 may be an individual providing an audio signal, such as speech. However, the speech source 102 may be substituted by any originator of a wanted signal in some embodiments. To illustrate, the wanted signal may comprise a decoded downlink signal, thus making a sender of the downlink signal the originator (e.g., see FIG. 2B).

The noise source 106 may provide stationary, non-stationary, and/or a combination of both stationary and non-stationary noise. The stationary noise may be considered to be relatively constant over time (e.g., car noise, street noise, and babble noise), while the non-stationary noise may be considered to be impulsive or rapidly changing over time (e.g., keyboard typing and music). Although only a single noise source 106 is depicted in FIG. 1, the noise source 106 may comprise any sounds from one or more locations. The noise source 106 may also include echoes and reverberation in accordance with various embodiments.

Figure 2A:
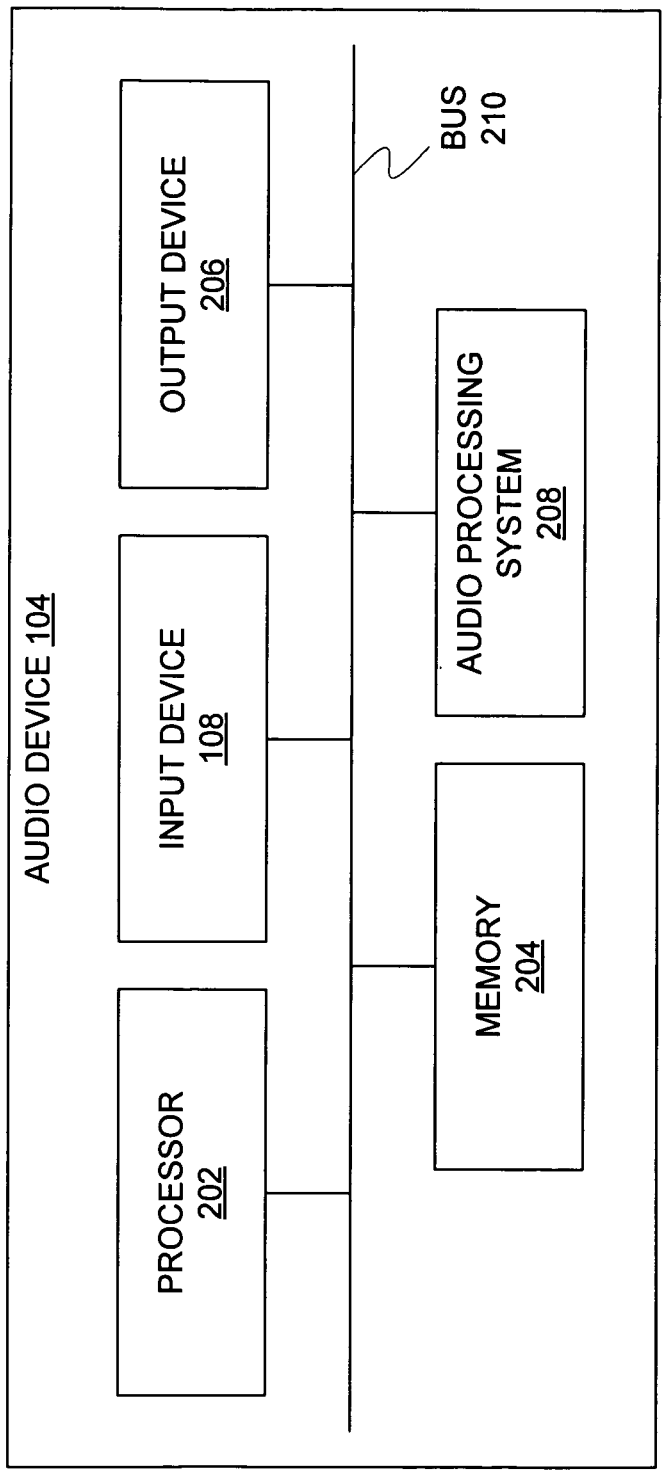
FIG. 2A is a block diagram of an exemplary audio device implementing various embodiments of the present invention.

FIG. 2A is a block diagram of the exemplary audio device 104 implementing various embodiments of the present invention. The audio device 104 may comprise any device configured to receive sound, for example, cellular phones, phone handsets, phone headsets, conferencing systems, and audio recording systems. The audio device 104 may include a processor 202, a memory 204, the input device 108, an output device 206, and an audio processing system 208, which are all coupled to a bus 210. The bus 210 provides communication between the components of the audio device 104. The audio device 104 may comprise further components that are necessary for certain operations, but that are not necessarily used with respect to embodiments of the present invention. The audio processing system 208 is discussed in further detail in connection with FIG. 3.

The processor 202 is configured to execute instructions. The instructions are operational when executed by the processor 202 to direct the processor 202 to operate in accordance with the invention. The components and functions described herein may be comprised of instructions that are stored in the memory 204 or any other computer-readable storage medium. These instructions may be retrieved and executed by the processor 202. Some examples of instructions include software, program code, and firmware.

The memory 204 may permanently and/or temporarily store data, including various instructions. Some examples of the memory 204 are RAM and ROM. According to various embodiments, the memory 204 may comprise a computer readable storage medium, for example, memory devices, hard drives, disks, integrated circuits, and flash memory. Those skilled in the art are familiar with various instructions, processors, and memories.

According to various embodiments, the input device 108 may comprise any device that can convert an acoustic signal into an electric signal, for example, an acoustic-to-electric transducer (e.g., a microphone). In some embodiments, the microphone may be omnidirectional or unidirectional. The electric signal may be converted by an analog-to-digital converter (not shown) into a digital signal for processing or storage, in accordance with some embodiments. In other exemplary embodiments, the input device 108 may receive an already digitized signal, such as the decoded downlink signal.

In one exemplary embodiment, the output device 206 may comprise any device that provides an audio output to a user. The output device 206 may comprise, for example, a speaker on a conferencing device or an earpiece of a headset or handset. In another exemplary embodiment, the output device 206 may output a digitized signal which may be encoded and transmitted over a communications channel (e.g., an uplink signal).

Figure 2B:
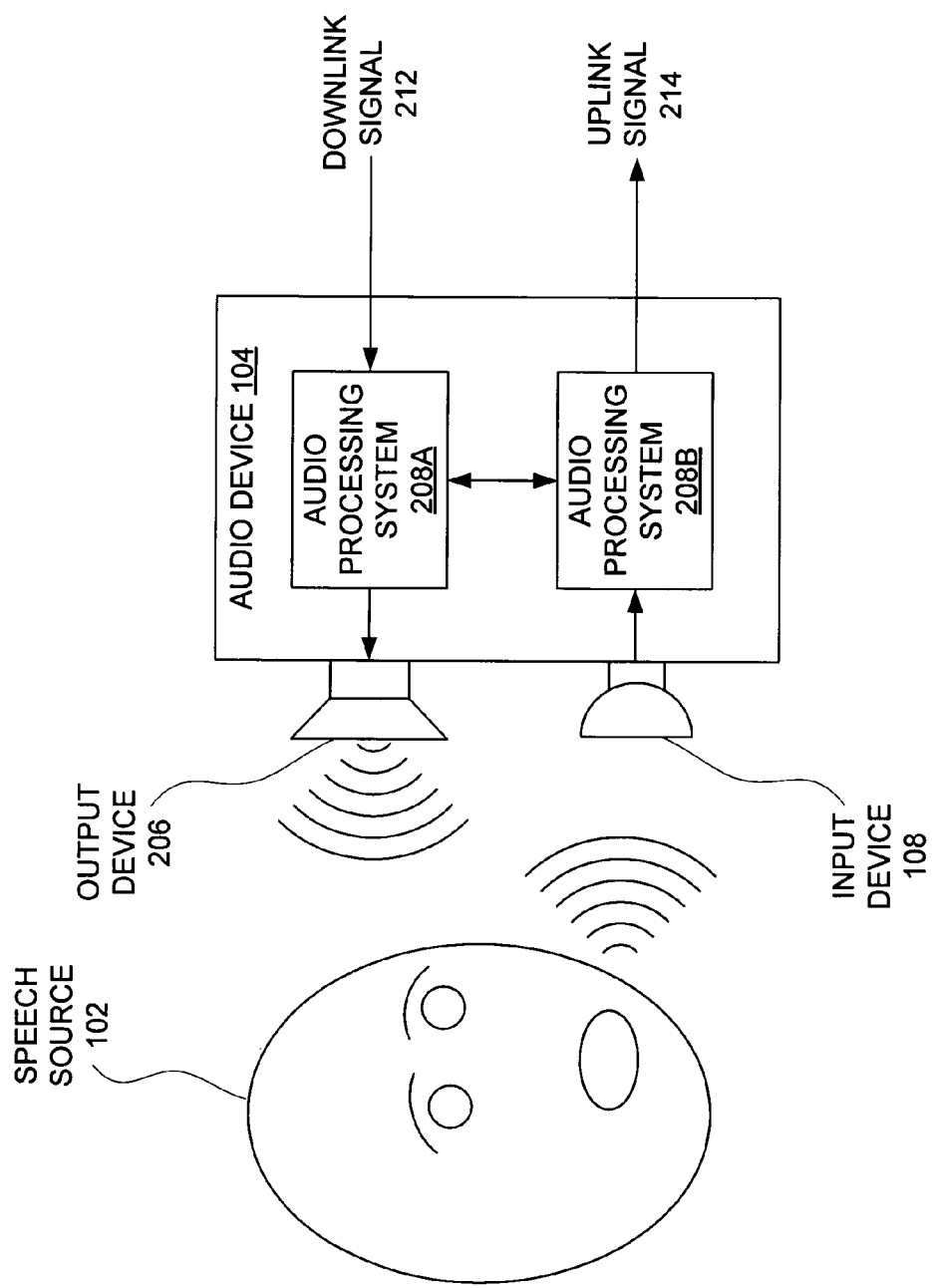
FIG. 2B is a block diagram of a usage scenario of various exemplary embodiments of the present invention.

FIG. 2B is a block diagram of a usage scenario of various exemplary embodiments of the present invention. The audio processing system 208A receives a downlink signal 212, which is enhanced and outputted by the output device 206. The signal from the speech source 102 in received by the input device 108 and enhanced by the audio processing system 208B. In turn, the enhanced signal from the speech source 102 may be transmitted as an uplink signal 214. In one embodiment, the audio processing system 208A and the audio processing system 208B are in communication such that acoustic echo cancellation or suppression may be performed on the signal from the input device 108. In another embodiment, the signal sent to the output device 206 may be modified based on the signal coming from the input device, for example, to increase audibility of the downlink signal 212 above the noise level in the environment 100 of the speech source 102. As one skilled in the art will appreciate, the audio processing system 208A and the audio processing system 208B may be combined into one system that facilitates two-way communication.

Figure 3:
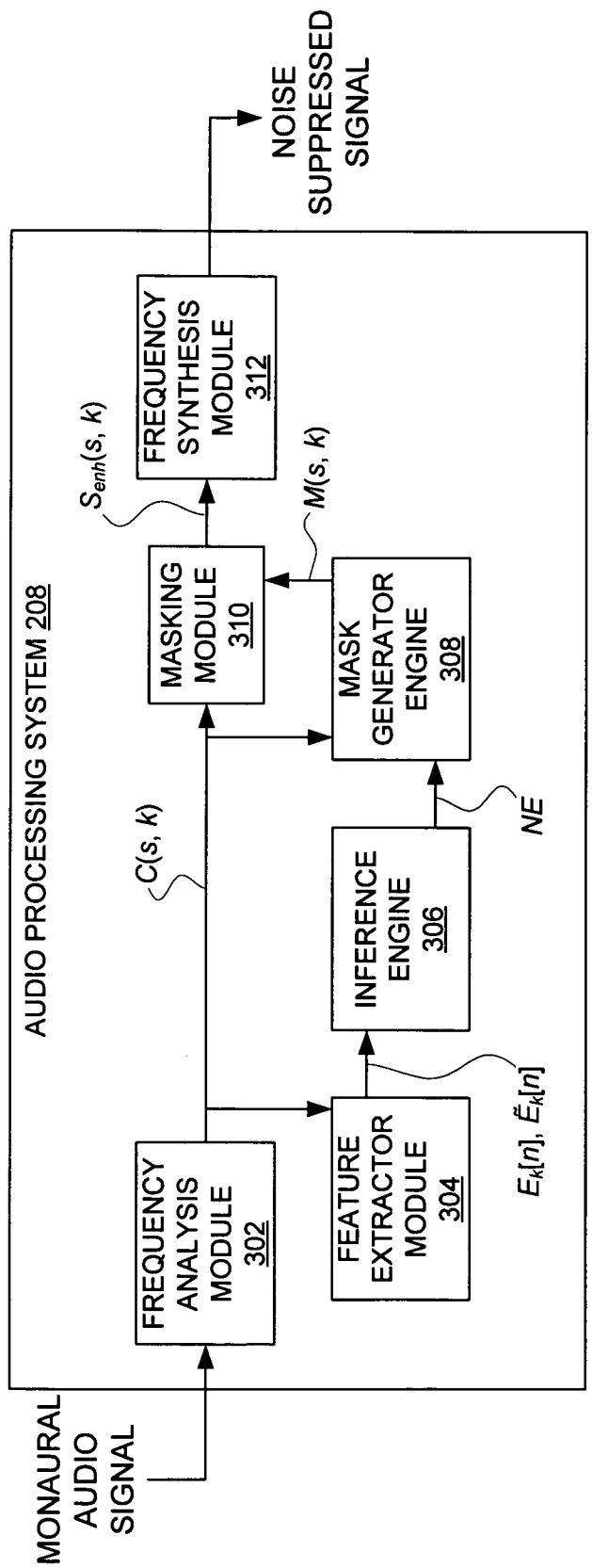
FIG. 3 is a block diagram of an exemplary embodiment of an audio processing system.

FIG. 3 is a block diagram of an exemplary embodiment of the audio processing system 208. The audio processing system 208 may comprise a frequency analysis module 302, a feature extractor module 304, an inference engine 306, a mask generator engine 308, a masking module 310, and a frequency synthesis module 312. In exemplary embodiments, the audio processing system 208 is embodied within a memory device, such as the memory 204. Although FIG. 3 describes the audio processing system 208 as including various engines and modules, fewer or more engines and modules may comprise the audio processing system 208 and/or any of the various engines and modules comprising the audio processing system 208 and still fall within the scope of various embodiments.

According to exemplary embodiments, the frequency analysis module 302 receives the monaural audio signal, for example, from the input device 108. As mentioned herein, the monaural audio signal received by the frequency analysis module 302 may comprise a decoded downlink signal. In one embodiment, the frequency analysis module 302 may be a filter bank. The frequency analysis module 302 may convert the monaural audio signal from the time-domain to the frequency-domain, such that the monaural audio signal may be separated into frequency sub-bands (also simply referred to as sub-bands).

The output of the frequency analysis module 302 may be sub-band signals that correspond to the sub-bands. According to some embodiments, the sub-band signals may result from performing a filtering operation on the monaural audio signal, where the bandwidth of the filter is narrower than the bandwidth of the monaural audio signal received by the frequency analysis module 302. Additionally, or alternatively, other filters such as short-time Fourier transform (SIFT), sub-band filter banks, modulated complex lapped transforms, cochlear models, wavelets, etc., may be used in conjunction with the frequency analysis module 302. Because most acoustic signals are complex and comprise more than one frequency, a sub-band analysis on the monaural audio signal received by the frequency analysis module 302 may be useful to determine certain characteristics of the signal within various frequency ranges during a frame (i.e., a predetermined period of time). In one embodiment, the frame is 5 milliseconds long.

The exemplary feature extractor module 304 is configured to receive the sub-band signals from the frequency analysis module 302 and determine one or more features (also referred to as cues). The cues may be used in discriminating between signals from the speech source 102 and the noise source 106. One such cue is a sub-band energy level. According to exemplary embodiments, the sub-band energy level may be an energy estimate of each of the sub-band signals over a time interval (i.e., frame) expressed in decibels. One definition of the sub-band energy level in sub-band k and frame n, $E_k[n]$, may be a mean of a magnitude-squared sub-band signal. In exemplary embodiments, speech and noise level distributions may be estimated based on the sub-band energy levels.

In addition to the sub-band energy level, the feature extractor module 304 may calculate a wide-bandwidth sub-band energy level, in exemplary embodiments. The wide-bandwidth sub-band energy level may be an energy estimate within a frequency sub-band that has a larger bandwidth than that of individual sub-band signals outputted from the frequency analysis module 302. In exemplary embodiments, the wide-bandwidth sub-band energy level may be calculated by a weighted sum of neighboring sub-band energy levels around a center frequency sub-band. In one example, energy within an octave bandwidth may be obtained by summing, with equal weight, all sub-band energy levels within half an octave above and below the center frequency sub-band k as follows:

$$\tilde{E}_k[n] = \frac{\sum_{m=1}^{nT} E_m[n] \cdot w_{k-m}}{\sum_{m=1}^{nT} w_{k-m}}, \qquad (1)$$

where nT is a number of sub-bands, $W_k=1$ for $|k| \leq K_{oct}/2$ and zero otherwise, and $K_{oct}$ is a number of sub-bands per octave determined in the frequency analysis module 302. In exemplary embodiments, it may be inferred whether a given sub-band is dominated by speech or noise based on the energy level of a given sub-band and the energy level of surrounding sub-bands, for example, since speech activity may tend to produce correlated energy level changes across adjacent sub-bands.

The exemplary inference engine 306 is configured to determine a noise estimate for the audio signal. The noise estimate may comprise a stationary noise estimate, a non-stationary noise estimate, or various combinations thereof. In exemplary embodiments, the inference engine 306 may receive the sub-band energy levels, $E_k[n]$, and the wide-bandwidth sub-band energy levels, $\tilde{E}_k[n]$, from the feature extractor module 304. The sub-band energy level and wide-bandwidth sub-band energy level may be combined to form a hypothesis of an instantaneous SNR (i.e., the SNR within a particular time frame) within a given sub-band using probability distributions of the wide-bandwidth sub-band energy levels over a given duration of history, in accordance with various embodiments.

In one example, the inference of the instantaneous SNR per sub-band may be obtained in two successive stages. Firstly, an initial prediction of the instantaneous SNR is made given two determined energy levels (e.g., the sub-band energy level and the wide-bandwidth sub-band energy level), which may be referred to as an observed instantaneous SNR. Secondly, adaptive smoothing of the observed instantaneous SNR may be performed, for example, using a Kalman filter. The inference engine 306 may finally generate a final noise estimate, which may be outputted to the mask generator engine 308. The inference engine 306 is discussed in further detail in connection with FIG. 4.

The exemplary mask generator engine 308 is configured to generate a mask which is applied by the masking module 310 to the audio signal. Generation of the mask may comprise generating and applying a preliminary mask to the audio signal, estimating a pitch of a resulting signal, and then, according to exemplary embodiments, modifying the mask based upon a pitch estimate, referred to as harmonic sharpening. The mask generator engine 308 is discussed in further detail in connection with FIG. 5.

In exemplary embodiments, the masking module 310 is configured to apply the mask to the sub-band signals of the audio signal. In some embodiments, the masking Module 310 up-samples the mask output of the mask generator engine 308. In some examples, a constrained linear interpolator may be used to interpolate mask values between two frames, which may limit a mask slew rate. In turn, the masking module 310 applies the mask, M(s, k), to the sub-band signals, C(s, k), from the frequency analysis module 302 such that $$S_{enh}(s,k) = C(s,k) \cdot M(s,k), \qquad (2)$$

where s and k are sample and sub-band indexes, respectively, and $S_{enh}(s, k)$ is an enhanced sub-band signal.

According to various embodiments, the frequency synthesis module 312 combines the enhanced sub-band signals to generate an enhanced, noise suppressed audio signal. In exemplary embodiments, the frequency synthesis module 312 converts the enhanced sub-band signals to the time-domain. The frequency synthesis module 312 may utilize an inverse of filtering operation(s) or transform performed by the frequency analysis module 302 to construct the enhanced audio signal.

Figure 4:
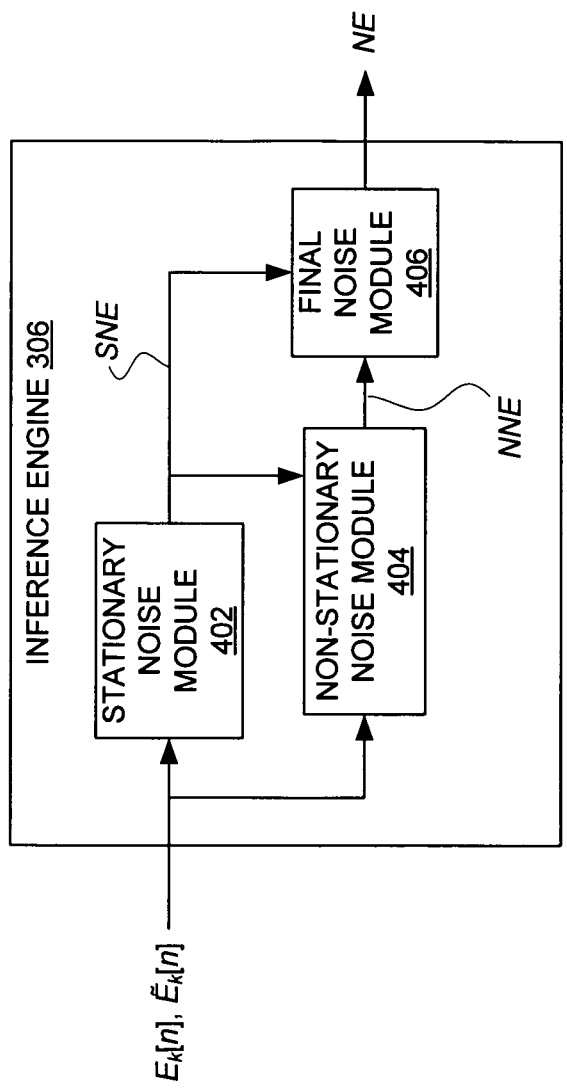
FIG. 4 is a block diagram of an inference engine according to exemplary embodiments.

Referring to FIG. 4, a block diagram of the exemplary inference engine 306 is shown in more detail. As depicted, the inference engine 306 comprises a stationary noise module 402, a non-stationary noise module 404, and a final noise module 406. The inference engine 306 is configured to generate a noise estimate, based at least in part, on stationarity (i.e., stationary and/or non-stationary).

The stationary noise module 402 may provide a stationary noise estimate based on an assumption that the noise levels change at slower rates than the speech levels. It is noted that in some embodiments, the stationary noise module 402 may comprise, or be referred to as, a minimum statistics tracker. The minimum statistics tracker is described in U.S. patent application Ser. No. 12/072,931, filed Feb. 29, 2008 and entitled "System and Method for Providing Single Microphone Noise Suppression Fallback," which has been incorporated herein by reference. In exemplary embodiments, the stationary noise estimate may be obtained using the sub-band energy level and wide-bandwidth sub-band energy level provided by the feature extractor module 304 during speech pauses to extrapolate across regions where speech is present. One skilled in the art will recognize that various embodiments of the present invention do not need to rely on minimum statistics tracking to obtain a stationary noise estimate.

The non-stationary noise module 404 may infer the instantaneous SNR per time frame, as described herein, given a corresponding sub-band energy level and wide-bandwidth sub-band energy level provided by the feature extractor module 304. The non-stationary noise module 404 may perform several processes leading to a non-stationary noise estimate, in accordance with various embodiments.

One process that the non-stationary noise module 404 may perform includes calculating the wide-bandwidth sub-band energy level distribution of the mixed signal comprising both the wanted and the unwanted components (e.g., speech and noise). An energy level distribution for a given signal is a probability distribution as a function of energy level, which may, for example, indicate the likelihood of measuring a particular energy level in the signal at an arbitrary time. The energy level distribution may be derived from a histogram of measured energy levels over time, by an appropriate normalization. Calculating the wide-bandwidth sub-band energy level distribution of the mixed signal may be performed in an adaptive manner, for example, in order to adapt to long-term changes in the characteristics of the speech source 102 or noise source 106 (e.g., the speech source may change in volume or the noise type may change suddenly, such as from car noise to street noise). An adaptation time constant may be set for the energy level distribution and be converted to an equivalent number of frames, M. For a single sub-band, an energy level distribution, h(b), where b=1, ..., B is the energy level bin index, may be adapted over time by accumulating energy level measurements in a "leaky" manner. As such, the adaptation of the energy level distribution may be represented as $$h(b) = h(b) + \left[ \left( L_b \le \tilde{E}[n] < L_{b+1} \right) - h(b) \right] \cdot \frac{1}{m}, \quad (3)$$

where $L_b$ and $L_{b+1}$ are lower and upper bounds in decibels for the energy level bin b, respectively, and m is similar to a time constant for a first-order leaky integrator, for example. In order to achieve a rapid initial convergence of the energy level distribution, m may be set equal to a number of frames from a start of the audio processing until m reaches M. In exemplary embodiments, once m=M, m may remain constant (e.g., m=1, 2, ..., M, M, ...). In some cases, an explicit normalization of the energy level distribution may not be necessary to interpret the energy level distribution as a probability distribution since if $L_1 = -\infty$, $L_{B+1} = \infty$, and the energy level bins are distinct and monotonically increasing, then $$\sum_{b=1}^{B} h(b) = 1.$$

Another process performed by the non-stationary noise module 404 may include inferring wide-bandwidth sub-band energy level distributions of both the speech and the noise separately. In one embodiment, the speech energy level distribution may be determined, partly, by the wide-bandwidth energy level distribution of a training clean speech signal, and partly, by an overall gain of the speech component of the mixed signal (e.g., the monaural audio signal) relative to the training clean speech signal. The overall gain may be determined by maximizing a cross-correlation across energy level and sub-band indices between a wide-bandwidth energy level distribution of the training clean speech signal and a wide-bandwidth energy level distribution of the mixed signal.

In another embodiment, the overall gain may be determined, partly, by a median value across sub-bands of the difference between an upper percentile energy level (e.g., 95% level) of the mixed signal and an upper percentile energy level of the training speech. The median may be used rather than a mean to improve robustness when isolated bands are severely corrupted by noise. In exemplary embodiments, the upper percentile value may be adjusted using an external voice activity detector, based upon an average percentage of speech activity over the adaptation time constant of the energy level distribution of the mixed signal.

A noise energy level distribution may represent the wide-bandwidth sub-band energy level distribution of the noise, according to some embodiments. The noise energy level distribution may be inferred from the mixture energy level distribution. One solution that may be adequate for many noise sources assumes that noise dominates lower energy levels of the mixture distribution. By setting a percentile level between zero and one, which reflects a percentage of time that speech is expected to be absent, a noise energy level distribution, $h_n(b)$, may be obtained from the mixture distribution, $h_m(b)$, using, for example:

$$h_n(b) = \begin{cases} \dfrac{h_m(b)}{\eta \cdot \sum_{b=1}^{B} h_m(b)}; & b \le \eta \cdot \sum_{b=1}^{B} h_m(b) \\ 0; & b > \eta \cdot \sum_{b=1}^{B} h_m(b). \end{cases} \quad (4)$$

In an alternative embodiment, the noise distribution may be obtained by subtracting the speech energy level distribution from the mixture distribution.

The non-stationary noise module 404 may also infer the instantaneous SNR by factoring in that a wide-bandwidth energy level measurement or "observation" of a sub-band of the mixed signal falling into an energy level bin b may correspond to one of two conditions:
 (i) speech is present at the energy level bin b and noise is present at any energy level bin<b, or
 (ii) noise is present at the energy level bin b and speech is present at any energy level bin<b.

The observed instantaneous SNR, ISNR(b), may be determined as a function of wide-bandwidth energy level bin b, for example, as follows:

$$ISNR(b) = \frac{h_s(b) \cdot g_s(b) + h_n(b) \cdot g_n(b)}{h_s(b) + h_n(b)}, \quad (5)$$

where $g_s(b)$ is an expectation of ISNR(b) in condition (i) and $g_n(b)$ is the expectation of ISNR(b) in condition (ii). The expectations of ISNR(b) may be represented, for example, by:

$$g_s(b) = \delta \cdot \sum_{p=1}^{b-1} (b-p) \cdot h_n(p) \quad (6)$$

and $$g_n(b) = \delta \cdot \sum_{p=1}^{b-1} (b-p) \cdot h_s(p), \quad (7)$$

where δ is a resolution of the energy level bins. In one embodiment, δ is roughly 3 decibels.

An observed variance of the instantaneous SNR, VISNR (b), may be determined by the non-stationary noise module 404, for example, by:

$$VISNR(b) = \frac{h_s(b) \cdot f_s(b) + h_n(b) \cdot f_n(b)}{h_s(b) + h_n(b)}, \quad (8)$$

where $f_s(b)$ is an expectation of VISNR(b) in condition (i) and $f_n(b)$ is an expectation of VISNR(b) in condition (ii). The expectations of VISNR(b) may be expressed, in exemplary embodiments, by:

$$f_s(b) = \sum_{p=1}^{b-1} |ISNR(b) - \delta \cdot (b-p)|^2 \cdot h_n(p) \quad (9)$$

and $$f_n(b) = \sum_{p=1}^{b-1} |ISNR(b) - \delta \cdot (p-b)|^2 \cdot h_s(p). \quad (10)$$

The observed variance of the instantaneous SNR may indicate an expected variance of the observed instantaneous SNR, which may be used in a Kalman filter to determine the Kalman gain.

The observed instantaneous SNR, ISNR(b), which is derived from the distribution of the wide-bandwidth energy level, $\tilde{E}[n]$, in the mixture, may be adjusted based on the sub-band energy level, E[n], determined by the feature extractor module 304. In one exemplary embodiment, ISNR (b) may be perturbed by an amount proportional to the spectral contrast, $E[n] - \tilde{E}[n]$. The observed variance of the instantaneous SNR, VISNR(b), may also be adjusted based upon the sub-band energy level, E[n].

A real instantaneous SNR per sub-band in the mixed signal may be modeled as the state of a Kalman filter. The transition of the state from frame-to-frame may be optimally smoothed under the assumption that the temporal dynamics of both the speech and noise energy levels, and consequently the instantaneous SNR, are constrained. The observed instantaneous SNR may be considered to be observations of the state which are corrupted by Gaussian "observation noise." VISNR(b) may provide an estimate of the variance of the observation noise. The prediction variance of the Kalman filter, may determine the a priori probability of a particular state transition between frames. The non-stationary noise module 404 may apply the Kalman filter to obtain an optimally and temporally-smoothed version of the observed instantaneous SNR, balancing the variance of the observation noise the prediction variance of the Kalman filter, in the form of a Kalman gain.

Some embodiments may invoke a simple model for an evolution of the state x[n], such as the instantaneous SNR, from frame n−1 to n that assumes $$x[n] = x[n-1] + w[n], \quad (11)$$

where $w[n] \sim N[0, Q]$ is a process noise with prediction variance Q. In some examples, Q may be assumed to be constant based on empirical data. In turn, the observed instantaneous SNR at frame n may be measured to be, for example:

$$z[n] = x[n] + v[n], \quad (12)$$

where $v[n] \sim N(0, R[n])$ is an observation noise with variance R[n] (e.g., VISNR(b)).

Using this simple model, a prediction stage and an update stage of the Kalman filter may estimate the state x[n] given noisy observation z[n] (e.g., the observed instantaneous SNR at frame n) and the previous state x[n−1]. For example, the prediction stage may predict the state in the current frame n as $$\hat{x}[n] = x[n-1]. \quad (13)$$

This may be interpreted as an expectation that the instantaneous SNR may remain fairly constant on average from frame to frame. A predicted variance of the state estimate may follow as $$\hat{p}[n] = p[n-1] + Q. \quad (14)$$

The update stage of the Kalman filter may comprise determining a measurement residual, the Kalman gain, an updated state estimate, and an updated variance of the state estimate. The measurement residual may be calculated, for example, as $$y[n] = z[n] - \hat{x}[n]. \quad (15)$$

In exemplary embodiments, the Kalman gain may be calculated as $$G[n] = \frac{\hat{p}[n]}{\hat{p}[n] + R[n]}. \quad (16)$$

In various embodiments, the updated state estimate and the updated variance of the state estimate may be determined by $$x[n] = \hat{x}[n] + G[n] \cdot y[n] \quad (17)$$

and $$p[n] = (1 - G[n]) \cdot \hat{p}[n], \quad (18)$$

respectively. The extent to which the Kalman filter temporally smoothes the observed instantaneous SNR may be dependent on the input mixed signal and may also depend on a value set for the process variance Q.

The non-stationary noise module 404 may finally derive a non-stationary noise estimate, NNE, from the state of the Kalman filter, x[n], and the stationary noise estimate, SNE, determined in the stationary noise module 402, for example, such that $$NNE = \max\left(SNE, \frac{E[n]}{1 + 10^{(ISNR_{Kalman} - \Delta_{SNR})/10}}\right), \quad (19)$$

where E[n] is a sub-band energy of the mixed signal and $\Delta_{SNR}$ is an offset applied to x[n]. Typically, ISNR may be close or equal to zero, although in some examples, $\Delta_{SNR}$ may be made dependent on the SNR determined for the mixture, for example, across all sub-bands.

The exemplary final noise module 406 is configured to combine the non-stationary noise estimate determined by the non-stationary noise module 404 with the stationary noise estimate determined by the stationary noise module 402 into a final noise estimate. Since the stationary noise estimate may be fairly insensitive to the SNR, and at low SNRs the non-stationary noise estimate may not be reliable, the final noise module 406 may adjust a weight given to the non-stationary noise estimate and the stationary noise estimate to optimize the final noise estimate. According to various embodiments, the final noise module 406 may provide a smooth transition in the final noise estimate from being dominated by the non-stationary noise estimate at high SNRs to being dominated by the stationary noise estimate at low SNRs.

In some embodiments, calculation of the SNR in the final noise module 406 may be based on the overall gain of the speech level determined by the interference engine 306, the energy level of a training speech signal, the noise estimate determined by the stationary noise module 402, or combinations thereof.

In some embodiments, a transition region in the SNR may be defined by a lower and an upper threshold in decibels as $SNR_{low}$ and $SNR_{high}$, respectively. A transition, or cross-fade, between the stationary noise estimate and the non-stationary noise estimate may be determined by linear interpolation in the logarithmic domain to obtain the final noise estimate as follows:

$$NE = w \cdot NNE + (1-w) \cdot SNE, \qquad (20)$$

where NE is the final noise estimate and $$w = \min\left(1, \max\left(0, \frac{SNR - SNR_{low}}{SNR_{high} - SNR_{low}}\right)\right). \qquad (21)$$

Figure 5:
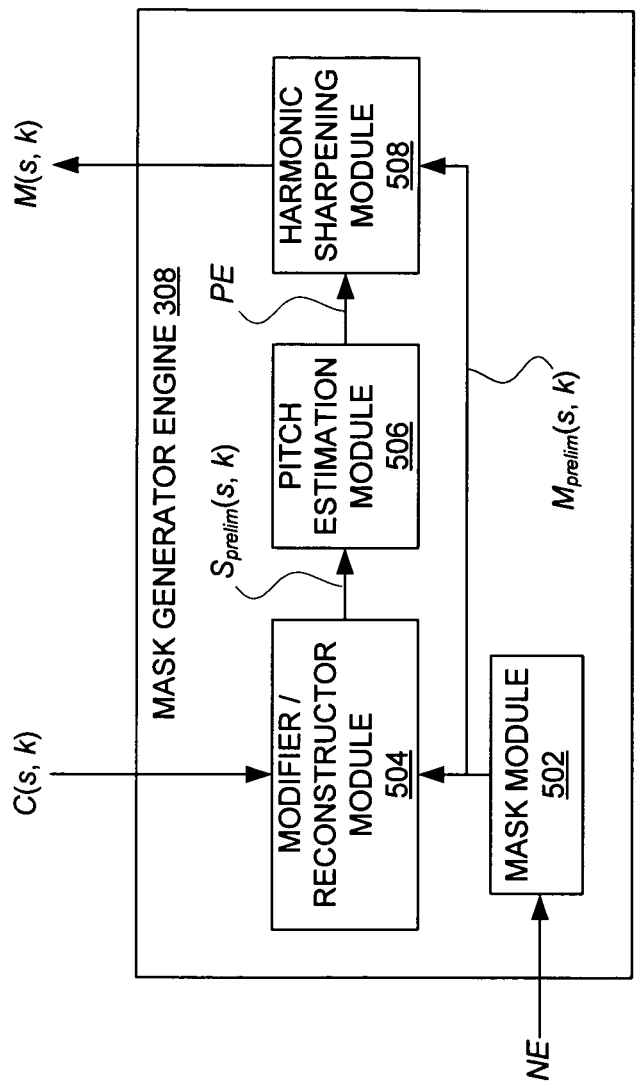
FIG. 5 is a block diagram of an exemplary embodiment of the mask generator engine.

FIG. 5 is a block diagram of an exemplary embodiment of the mask generator engine 308. The mask generator engine 308 may comprise a mask module 502, a modifier/reconstructor module 504, a pitch estimation module 506, and a harmonic sharpening module 508, according to various embodiments.

The exemplary mask module 502 is configured to generate a preliminary mask and a perceptual mask based on the final noise estimate received from the inference engine 306. It is noted that in various embodiments, the mask module 502 may comprise, or be referred to as, an adaptive intelligent suppression (AIS) generator. The AIS generator is described in U.S. patent application Ser. No. 11/825,563, filed Jul. 6, 2007 and entitled "System and Method for Adaptive Intelligent Noise Suppression," which has been incorporated herein by reference. In one embodiment, the mask module 502 may comprise a Wiener filter. In exemplary embodiments, the preliminary mask may be subsequently used by the modifier/reconstructor module 504 and the perceptual mask may be subsequently used by the harmonic sharpening module 508, as discussed further herein.

In exemplary embodiments, the modifier/reconstructor module 504 may generate a preliminary signal (also referred to as a preliminary noise suppressed signal). As such, the modifier/reconstructor module 504 may be referred to as a preliminary signal module in various embodiments. The preliminary signal, $S_{prelim}(s, k)$, may be generated by applying the preliminary mask, $M_{prelim}(s, k)$, to the sub-band signals, $C(s, k)$, from the frequency analysis module 302 such that, for example, $$S_{prelim}(s,k) = C(s,k) \cdot M_{prelim}(s,k), \qquad (22)$$

where s and k are sample and sub-band indexes, respectively. According to some embodiments, the modifier/reconstructor module 504 may convert the preliminary signal to the time-domain (e.g., using an inverse of the filtering operations performed by the frequency analysis module 302) prior to outputting the preliminary signal to the pitch estimation module 506. In exemplary embodiments, reducing the noise in the signal inputted to the pitch estimation module 506 relative to the monaural input signal, may improve pitch estimation performance. In this regard, the preliminary mask generated by the mask module 502 may be optimized for subsequent pitch estimation performance, whereas the perceptual mask generated by the mask module 502 may be optimized for overall subjective quality. In other embodiments, a pitch estimation method may be applied directly to the input monaural signal, and the preliminary mask and modifier/reconstructor module 504 may be unnecessary.

The pitch estimation module 506 is configured to determine a pitch estimate based on the preliminary signal from the modifier/reconstructor module 504. In embodiments where the preliminary signal has been converted to the time-domain, an estimate of pitch in each frame may be obtained using a time-domain autocorrelation based method. In one embodiment, the time-domain autocorrelation based method may be similar to an open-loop pitch analysis in ITU-T recommendation G.729. The estimate of the pitch may be used by the harmonic sharpening module 508 as discussed herein.

The exemplary harmonic sharpening module 508 is configured to improve the SNR of the output of the system. According to various embodiments, the harmonic sharpening module 508 may modify a perceptual mask generated by the mask module 502 such that additional gain may be applied to sub-bands containing speech harmonics. The additional gain may only be applied to sub-bands containing speech harmonics that are resolvable by the frequency analysis module 302, and/or when operating at low SNRs (e.g., SNR<10 decibels). Applying positive gain to sub-bands that have much wider bandwidth than the pitch estimate, may inadvertently boost any noise that also occupies that sub-band.

The harmonic sharpening module 508 may apply a gain in decibels to a sub-band, k, neighboring a predicted speech harmonic, m, by an amount $W_m(k-v)$, where v may be the closest sub-band in frequency to the predicted harmonic. In one simple exemplary embodiment, an additional gain may be applied only to the closest sub-band to the predicted harmonic, i.e., the gain function $W_m(k-v)=0$ if $k \neq v$. Alternative gain functions may be utilized, such as where both the nearest sub-band to the harmonic and the sub-bands adjacent to the nearest sub-band have a positive gain. A harmonic sharpening mask may be computed that is equal to one everywhere except at the harmonics, at which the harmonic sharpening mask is equal to $W_m(k-v)$ after converting from decibels to linear. The harmonic sharpening mask may be smoothed temporally, for example, by using a leaky integrator with a time constant of approximately 10 milliseconds. In exemplary embodiments, the perceptual mask and the harmonic sharpening mask may be combined to obtain a final mask to be outputted to the masking module 310. In one embodiment, the perceptual mask and the harmonic sharpening mask may be multiplicatively combined.

Figure 6:
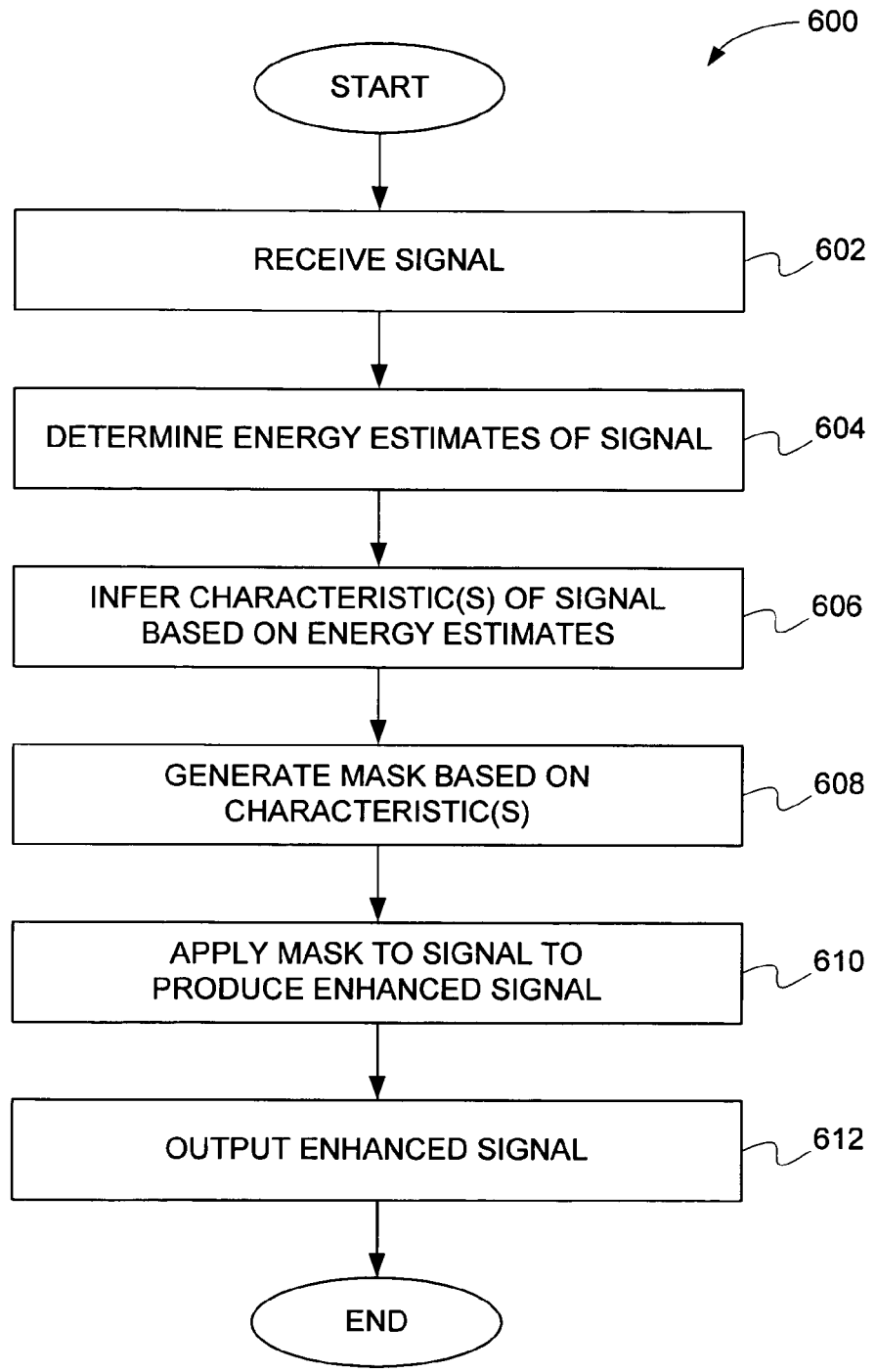
FIG. 6 is a flowchart of an exemplary method for enhancing a signal.

FIG. 6 is a flowchart of an exemplary process 600 for providing noise suppression on an audio signal. According to various embodiments, the process 600 may be performed by the audio processing system 208, the audio device 104, or any combination thereof.

At step 602, an audio signal is received. The audio signal may comprise the monaural audio signal having the wanted component (e.g., speech) and the unwanted component (e.g., noise). In some embodiments, the wanted signal may be speech, for example, emanating from the speech source 102, as described in connection with FIG. 1. In other embodiments, the audio signal may comprise the decoded downlink signal. As discussed herein, the frequency analysis module 302 may receive the audio signal, for example, from the input device 108. Furthermore, the frequency analysis module 302 may be a filter-bank, in accordance with some embodiments. The frequency analysis module 302 may also convert the audio signal from the time-domain into the frequency-domain for further processing. In one example, the audio signal may be separated into frequency sub-bands.

At step 604, energy estimates of the signal are determined. According to various embodiments, the energy estimates may be determined by the feature extractor module 304. According to one embodiment, a speech probability distribution and a noise probability distribution are determined based on the energy estimates.

At step 606, at least one characteristic of the signal is inferred based on the energy estimates. The at least one characteristic may be inferred by the inference engine 306, in accordance with various embodiments. In exemplary embodiments, the at least one characteristic comprises a noise estimate and/or a signal-to-noise ratio. Various assumptions may be involved in inferring the at least one characteristic. For example, a distribution of speech energy in the signal may be assumed to be different from a distribution of noise energy in the signal in one embodiment. Additionally, speech energy in the signal may be assumed to vary more rapidly than noise energy in the signal in some embodiments.

As discussed herein, the inference engine 306 may comprise the stationary noise module 402, the non-stationary noise module 404, the final noise module 406, and/or any combination thereof. The final noise module 406 may combine the stationary noise estimate from the stationary noise module 402 with the non-stationary noise estimate from the non-stationary noise module 404 into a final noise estimate. In some embodiments, the final noise estimate may be weighted towards the stationary noise estimate or the non-stationary noise estimate based on the estimate of the SNR of the audio signal in the final noise module 406.

At step 608, a mask based, in part, on the at least one characteristic is generated. The mask generator engine 308 may generate the mask in some embodiments. In exemplary embodiments, generating the mask may include using a pitch estimate, such as that provided by the pitch estimation module 506.

At step 610, the mask is applied to the signal to produce an enhanced signal. In exemplary embodiments, the masking module 310 may apply the mask to the signal from the frequency analysis module 302.

At step 612, the enhanced signal is outputted. The enhanced signal may then be outputted, for example, by a speaker or as an uplink signal. According to various embodiments, the enhanced signal may be converted to a time-domain, such as by the frequency synthesis module 312.

The above-described components and functions can be comprised of instructions that are stored on a computer-readable storage medium. The instructions can be retrieved and executed by a processor (e.g., the processor 202). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for enhancing a signal, the method comprising:
   receiving the signal, the receiving the signal comprising converting the signal to a frequency-domain such that the signal is separated into sub-bands;
   determining energy estimates of the signal for each sub-band of the signal;
   calculating an energy level distribution based on the energy estimates over time, the energy level distribution being a probability distribution as a function of energy level;
   determining a noise energy estimate for each sub-band of the signal and a speech energy estimate for each sub-band of the signal based on the energy level distribution;
   generating a mask for each sub-band of the signal based, in part, on the noise energy estimate for each sub-band of the signal and speech energy estimate for each sub-band of the signal;
   applying the mask to the signal for each sub-band of the signal to produce an enhanced signal; and
   outputting the enhanced signal.

2. The method of claim 1, wherein outputting the enhanced signal comprises converting the enhanced signal to a time-domain.

3. The method of claim 1, wherein a distribution of speech energy in the signal is different from a distribution of noise energy in the signal.

4. The method of claim 1, wherein speech energy in the signal varies more rapidly than noise energy in the signal.

5. A system for enhancing a signal, the system comprising:
   an input device configured to receive the signal;
   a frequency analysis module configured to convert the signal to a frequency-domain such that the signal is separated into sub-bands;
   a features module configured to determine energy estimates of the signal for each sub-band of the signal;
   an inference engine configured to determine an energy level distribution based on the energy estimates over time, the energy level distribution being a probability distribution as a function of energy level, and the inference engine being further configured to determine a noise energy estimate for each sub-band of the signal and a speech energy estimate for each sub-band of the signal based on the energy level distribution;
   a mask generator engine configured to generate a mask for each sub-band of the signal based, in part, on the noise energy estimate for each sub-band of the signal and speech energy estimate for each sub-band of the signal;
   a masking module configured to apply the mask for each sub-band of the signal to the signal to produce an enhanced signal; and
   an output device configured to output the enhanced signal.

6. The system of claim 5, further comprising a frequency synthesis module configured to convert the enhanced signal to a time-domain.

7. The system of claim 5, wherein the inference engine is further configured to assume that a distribution of speech energy in the signal is different from a distribution of noise energy in the signal.

8. The system of claim 5, wherein the inference engine is further configured to assume that speech energy in the signal varies more rapidly than noise energy in the signal.

9. A non-transitory computer readable storage medium having embodied thereon a program, the program being executable by a processor for performing a method for enhancing a signal, the method comprising:
   receiving the signal, the receiving the signal comprising converting the signal to a frequency-domain such that the signal is separated into sub-bands;
   determining energy estimates of the signal for each sub-band of the signal;
   determining an energy level distribution based on the energy estimates over time, the energy level distribution being a probability distribution as a function of energy level;
   determining a noise energy estimate for each sub-band of the signal and a speech energy estimate for each sub-band of the signal based on the energy level distribution;

generating a mask for each sub-band of the signal based, in part, on the noise energy estimate for each sub-band of the signal and speech energy estimate for each sub-band of the signal;

applying the mask to the signal for each sub-band of the signal to produce an enhanced signal; and outputting the enhanced signal.

10. The non-transitory computer readable storage medium of claim 9, wherein outputting the enhanced signal comprises converting the enhanced signal to a time-domain.

11. The non-transitory computer readable storage medium of claim 9, wherein speech energy in the signal varies more rapidly than noise energy in the signal.

12. The method of claim 1, wherein applying the mask results in attenuating signal components with low energy, and preserving signal components with high energy.

13. The method of claim 1, wherein determining the energy level distribution comprises tracking one or more percentile estimates of the energy estimates over time.

14. The method of claim 1, wherein calculating the energy level distribution comprises tracking an energy histogram over time.

15. The method of claim 1, wherein determining the noise energy estimate for each sub-band of the signal and the speech energy estimate for each sub-band of the signal comprises determining a speech energy histogram and a noise energy histogram.

16. The method of claim 1, wherein determining the noise energy estimate for each sub-band of the signal and the speech energy estimate for each sub-band of the signal depends on a predetermined speech energy histogram.

17. The method of claim 1, wherein determining the noise energy estimate for each sub-band of the signal and the speech energy estimate for each sub-band of the signal is based on one or more differences between tracked percentile estimates.

18. The method of claim 1, wherein determining the noise energy estimate for each sub-band of the signal is performed by computing a non-linear function of at least one of the energy estimates for the particular sub-band, a temporally-smoothed energy estimate for the particular sub-band, and a frequency-smoothed energy estimate for the particular sub-band.

* * * * *